United States Patent

[11] 3,577,732

| | | |
|---|---|---|
| [72] | Inventor | Jacobus De Haas |
| | | Haren, Netherlands |
| [21] | Appl. No. | 825,782 |
| [22] | Filed | May 19, 1969 |
| [45] | Patented | May 4, 1971 |
| [73] | Assignee | Shell Oil Company |
| | | New York, N.Y. |
| [32] | Priority | May 27, 1968 |
| [33] | | Netherlands |
| [31] | | 6,807,442 |

[54] MOTION CONVERSION SYSTEM
7 Claims, 1 Drawing Fig.

[52] U.S. Cl. ................................................... 60/52, 91/419

[51] Int. Cl. ............................................. F15b 15/18

[50] Field of Search ......................................... 60/52 (E), (Inquired); 60/52 (C.O.); 91/419

[56] References Cited
UNITED STATES PATENTS

| 2,389,164 | 11/1945 | Payne | 60/52 |
|---|---|---|---|
| 2,906,518 | 9/1959 | Kelley | 60/52S.R |
| 2,927,429 | 3/1960 | Carlson | 60/52 |
| 3,060,688 | 10/1962 | Gondek | 60/52 |
| 3,360,931 | 1/1968 | Jennings et al. | 60/52C.O. |

Primary Examiner—Edgar W. Geoghegan
Attorneys—Thomas R. Lampe and J. H. McCarthy ABSTRACT: A system for the conversion of the rotary movement of a shaft into a corresponding displacement of an element such as a moving element of a control valve.

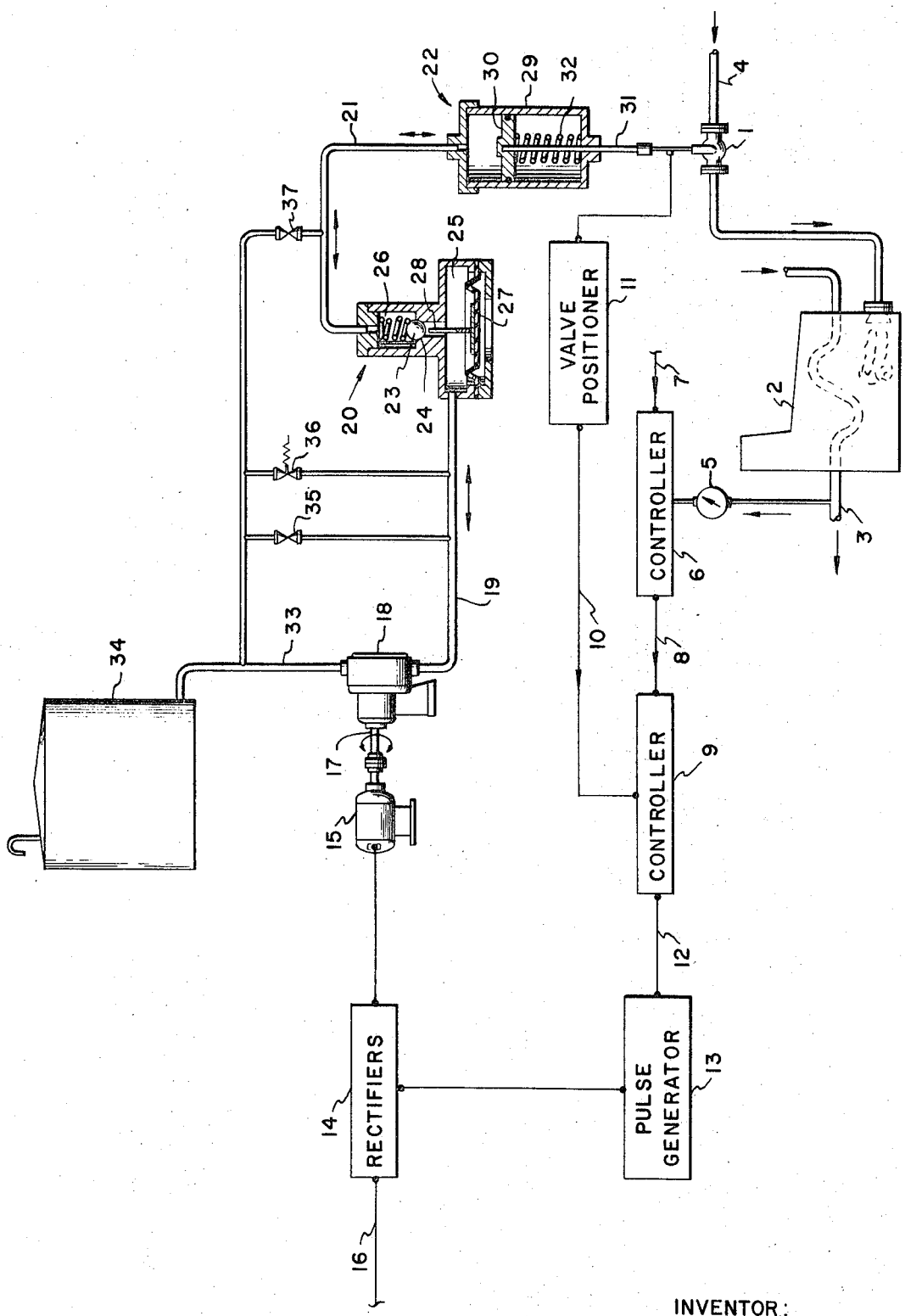

MOTION CONVERSION SYSTEM

The invention relates generally to a system for the conversion of a rotary movement of a shaft into a corresponding displacement of an element. This displacement can be a linear and/or an angular displacement; the invention is of special importance, however, in the conversion of a rotary movement into a corresponding linear displacement of a slidable element. Through use of said system a control valve may be controlled by means of an electric signal.

The system of the invention can be used for a variety of purposes in which a rotary movement is to be converted into a linear and/or angular displacement, for example for servocontrol, remote control, followup systems for the transmission of positions and/or movements; in particular, however, for the control of control valves. The invention will, therefore, be explained with particular reference to the control of a control valve, but the principles apply generally.

It is well known that control valves may be controlled pneumatically; however, a control of this type generally requires a compressor unit together with filters and drying equipment to provide pure compressed air. In many cases the erection of such a compressor system is too expensive, especially when there are only a few valves to be controlled. In other cases, especially when the control valve or control valves are to be remotely controlled or when the valves are to be left alone without constant supervision, the said compressor system would also have to be remotely controlled and be left alone for a longer time, which in most cases is not desirable from a point of view of maintenance or practicability.

It is also possible to control a control valve electrically. For electric control two embodiments are known. Each valve is provided with a small liquid pump which is continuously driven by means of an electric motor and thus produces a constant liquid flow. An electric control signal controls the position of a distribution valve which distributes at least part of the liquid flow over two different routes. If a change is effected in the liquid distribution a piston in a cylinder can be displaced in one direction or the other and in this way the position of a control valve can be influenced. The drawback of this control is that an electric motor as well as a pump have to be constantly in operation, which is not desirable—especially under the conditions described previously (remote control, control without constant supervision).

In the other embodiment the control valve is adjusted by means of an electric motor at the command of the electric signal. This embodiment has the drawback of requiring the use of a mechanical coupling between the motor and the control valve. If the control of the valve is such that control is constantly effected at the same or approximately the same value, in other words such that the moving part of the valve is constantly or almost constantly in the same or substantially the same position, the amount of wear occurring in the coupling will be such that an effective control around about the position in question becomes illusory.

SUMMARY OF THE INVENTION

It is therefore an object of the present invention to provide a control in which the aforesaid drawbacks are avoided. Fundamentally, this control is effected by a system for the conversion of a rotary movement of a shaft into a corresponding linear and/or angular displacement of an element.

This and other objects have been attained in the present invention by providing a system characterized by the combination of a reversible hydraulic pump coupled to the shaft; by a hydraulic motor provided with at least one pressure cylinder and with an element coupled thereto which can accomplish a linear and/or angular displacement; as well as by a hydraulic valve, the inlet of which is connected hydraulically to the outlet of the pump which outlet is hydraulically connected to the inlet of the hydraulic motor and which hydraulic valve is open or at least opens at a pump pressure higher than the pressure prevailing at the outlet side of the hydraulic valve and also at a pump pressure lower than a reference pressure (preferably atmospheric pressure or thereabouts), but which valve closes at other pump pressures.

In the following description the term "shaft" is understood to comprise any rotary drive of the hydraulic pump. During the conversion of a rotary movement into a linear displacement a linear hydraulic motor is usually coupled to a slidable element which can effect a linear displacement.

The hydraulic valve is preferably fitted with a diaphragm which communicates on one side with the open air and on the other side with the pump pressure, which diaphragm is provided with means for opening the valve body of the hydraulic valve against the pressure prevailing in the hydraulic motor as soon as the pump pressure falls below atmospheric pressure.

The diaphragm is usually provided with a plunger, capable of forcing the valve body of the hydraulic valve from the seat.

The inlet of the pump can be connected with an open storage vessel for hydraulic liquid. Preferably, a positive displacement pump is used. Frequently, and as a rule in the case of a positive displacement pump, a line with a very narrow passage (artificial leak) is arranged between the inlet and the outlet of the pump.

The operation of a control valve according to the invention by means of an electric control signal is effected as follows: a reversible 3-phase electric motor is controlled by means of the control signal; the electric motor drives a similarly reversible, hydraulic positive displacement pump; by means of a hydraulic valve the pump is in hydraulic communication with a linear hydraulic motor which operates the control valve; the hydraulic valve used for this purpose opens when the pump pressure exceeds the value of the pressure prevailing on the outlet side of the hydraulic valve and also when the pump pressure falls below a reference pressure (preferably atmospheric pressure), but is closed at other pump pressures.

As a rule, the electric control signal is obtained by comparing in a controller a control signal originating from a process which is influenced by the control valve, with a valve-positioning signal produced by the control valve. In this case, the output signal of the controller constitutes the desired control signal.

It is preferred to allow the control signal to act on a pulse generator the pulses of which control a number of controllable rectifiers (in particular controllable silicon diodes), which rectifiers control the supply of current from the network to the electric motor.

DESCRIPTION OF THE DRAWING

The above and other objects of the present invention will be understood from the following description taken with reference to the drawing wherein:

The drawing is a diagrammatic view illustrating the system according to the invention adapted to control a control valve.

As far as the present invention is concerned, it is, of course, completely immaterial what is actually controlled by the control valve. For a proper understanding of the present invention, it is assumed that the control valve 1 influences a process and in this particular case the operation of a furnace 2 for heating a liquid flow 3. It is assumed that the control valve is arranged in the fuel line 4 to the furnace. The temperature of the heated liquid flow is measured with a temperature gauge 5. The signal produced by this gauge (corresponding to the measured value of the temperature) is passed to a controller 6 which also receives a signal 7 representing the desired value of the temperature.

The control signal 8 produced by the controller 6 is compared in a second controller 9 with a signal 10 originating from the valve-positioning device 11 of the control valve 1. The valve-positioning signal 10 corresponds with the position of the control valve 1.

The controller 9 subsequently produces a control signal 12 by means of which the control valve 1 will finally be controlled in order to bring the temperature of the liquid flow 3 to the desired value 7 in the best possible manner and to maintain it at this value.

The control signal 12 which is already an electric signal or which is to be converted into an electric signal (the latter alternative is not shown in the drawing) subsequently controls the current received by a reversible electric motor 15 from the electric network 16 by means of a pulse generator 13 to be discussed hereinafter and a set of rectifiers 14.

By means of a shaft 17 the electric motor 15 is coupled to a reversible hydraulic pump 18. By means of a line 19, a hydraulic valve 20, and a line 21, the outlet of this pump is hydraulically connected with a linear hydraulic motor 22.

The hydraulic valve 20 has a movable valve body 23 represented in the drawing as a spring-loaded spherical body fitting on a valve seat 24 and hermetically sealing this seat. The valve body and seat assembly divides the hydraulic valve 20 into two parts: an inlet chamber 25 and an outlet chamber 26. The inlet chamber 25 communicates with the hydraulic motor 22. The hydraulic valve 20 further comprises a diaphragm 27 provided with a plunger 28, which under certain conditions is capable of forcing the valve body 23 from the valve seat 24.

The linear hydraulic motor 22 consists essentially of a cylinder 29, in which a very close-fitting piston 30 can move. The piston is connected with the control valve 1 by means of a rod 31. As the piston moves up and down, the control valve is adjusted in one position or the other. The control valve can, of course, also be completely opened or completely closed in this way. The line 21 issues above the piston, and, in principle, liquid, which is being forced into the cylinder 29 via this line, can force the piston downwards against the action of a spring 32.

On the other hand, if liquid is withdrawn from chamber 25 the spring 32 forces the piston 30 upwards, thus expelling the liquid from the cylinder 22. The operation of the previously described system from rectifiers 14 up to and including spring 32 is as follows.

The electric control signal causes the electric motor 15 to rotate in one direction or the other or ensures that the electric motor remains inactive (or stops if the motor was originally in motion). Thus, it depends on the nature of the control signal whether the electric motor starts rotating to the right, to the left, or remains/becomes inactive.

The hydraulic positive displacement pump 18 displays exactly the same behavior as the electric motor. As a result the pump forces liquid into the line 19 or tends to remove liquid from this line or is inactive. By means of a line 33 the inlet of the pump communicates with a storage vessel 34 containing the hydraulic medium. If the pump tends to remove liquid from the line 19 this liquid returns to the storage vessel 34. Conversely, liquid which is forced into the line 19 is derived from the storage vessel 34. The storage vessel 1 must be placed at sufficiently high level.

If the pump rotating in a certain direction forces an amount of liquid into the line 19, this amount of liquid passes to the space within hydraulic motor 22 above the piston 30 via the inlet chamber 25, the valve 23, the outlet chamber 26 and the line 21.

If the pump rotates in the opposite direction the liquid would likewise have to flow in the opposite direction; in this case, however, the valve body 23 seals off the seat 24 so as to prevent such a flow from the outset. However, the withdrawal of hydraulic liquid from the inlet chamber 25 via the line 19 immediately causes a subatmospheric pressure in the inlet chamber. As a result the atmospheric pressure will depress the diaphragm 27 upwardly, thus causing the plunger 28 to force the valve body from the seat 24, so that liquid from the line 19 can flow to the pump. The exterior of the diaphragm 27 need not necessarily be in contact with the open air. The exterior of the diaphragm 27 may also be subject to another pressure (reference pressure) which differs from the atmospheric pressure. However, as reference pressure use is preferably made of atmospheric pressure.

From the above it follows that the hydraulic valve 20 permits passage if the pump pressure exceeds the pressure prevailing on the outlet side of the hydraulic valve 20 or lower than the said reference pressure, but that it closes at other pump pressures.

The electric motor 15 and the pump 18 only rotate (in a particular direction) as long as the control signal indicates that the control valve 1 requires adjustment. Once the control valve has been adequately adjusted, so that the control signal assumes a value which corresponds with the action signal "stop," the electric motor and consequently the pump stop immediately, the valve 23 closes (partly by spring action on the valve body), the liquid in the outlet chamber 26, in the line 21 and in the space 22 above the piston 30 retains the pressure prevailing in this part of the system at the moment of closure and the control valve is no longer adjusted any further.

In addition, the inlet and the outlet of the positive displacement pump are interconnected by a line with a narrow passage 35; this narrow passage constitutes as it were an artificial leak as a result of which the pressure in the line 19 and in the inlet chamber 25 assumes the value of the atmospheric pressure after some time. This is a contributing factor in the particularly accurate sealing action of valve body 23.

Arranged in parallel with the passage 35 is a safety valve 36 which opens at too high an excess pressure. Also provided is a vent cock 37 which is only used on putting the system into operation and otherwise remains closed.

In emergencies a relatively low pressure, exerted on the diaphragm 27, is sufficient to remove the hydraulic pressure of the pressure motor and to cause the piston 30 to move to an extreme position by means of the pressure of the spring 32 (depending on the function of the control valve this extreme position may correspond with the closed or open control valve; in the present case the control valve will close).

Although in the embodiment discussed reference was only made to a linear displacement, it is also possible to use a hydraulic motor with a moving element which carries out an angular displacement or a combined linear/angular displacement. A known angular displacement is carried out, for example, by a vane-shaped element in a cylinder, which element can effect an angular displacement around the shaft of the cylinder relative to a fixed axial partition dividing the cylinder longitudinally in two halves.

For the purpose of driving the hydraulic pump a variety of electric motor systems can be used, for example a system with two single-phase motors connected in opposition to one another or a motor with two stator windings. It is of particular advantage, however, to use the system in combination with a 3-phase electric motor, each of the phases of the network being connected to the corresponding phase of the electric motor via a controllable rectifier, since this system starts immediately in both directions of rotation and also stops immediately.

In this system use is made of a pulse generator 13 capable of producing control pulses, the occurrence of which is related with the frequency of the network 16 and which system is further characterized by a connection of the pulse generator with each of the rectifiers 14, such that a generated control pulse invariably causes the temporary conductance of the relevant rectifier (and consequently of a current pulse through the rectifier) for a half or approximately a half cycle of the network; as well as by a control system for the pulse generator and which in dependence on the nature, in particular of the size and/or the direction of the control signal, can induce the pulse generator to produce control pulses in such a manner that the resultant current pulses either produce a torque in one direction of rotation of the electric motor or in the other, or produce torques of short duration in one direction of rotation and in the other alternately. The electric motor preferably has a star-connected stator, in which each of the phase lines running from the network to one of the phases of the motor includes a controllable diode, preferably a silicon diode, which diodes are all connected correspondingly relative to the star point.

In a particularly favorable embodiment of this system use is made of a control system capable of ensuring that current pulses are passed, in a certain direction, to two of the three phases of the motor, viz invariably at alternating cycles of the network and that in dependence on the nature, in particular of the size and/or the direction of the control signal, the third phase receives: (a) current pulses which are displaced in phase by 120° (at least approximately 120°) in respect of one of the two other phases, viz invariably at alternating cycles of the network; or (b) current pulses which are displaced in phase by 480° (at least approximately 480°) in the same direction in respect of the same of the two other phases, viz invariably at alternating cycles of the network; or (c) the current pulses referred to under (a) and under (b).

For feeding the electric motor use is often made of a network with a mains frequency which is higher and preferably much higher than the frequency (50 cycles) of the normal power network. It is advisable to use a frequency, for example of 200—500 cycles, preferably of approximately 400 cycles.

It is often advantageous to use a transformer connected to the normal power network, which transformer supplies the power for the motor at a frequency (possibly adjustably frequency) which is higher than the mains frequency of the power network.

I claim:

1. A system for converting rotary movement of a shaft into a corresponding displacement of an element, said system comprising, in combination:
    a reversible hydraulic pump coupled to said shaft and having an inlet and an outlet;
    a hydraulic motor provided with at least one pressure cylinder having an inlet and a displaceable element operatively associated with said pressure cylinder; and
    hydraulic valve means including a valve having an inlet in communication with said pump outlet and an outlet in communication with said motor inlet, said valve means being adapted to open said valve both if the pump pressure exceeds the pressure prevailing at the outlet of said valve and at a pump pressure lower than a predetermined reference pressure and closed at other pressures.

2. The system of claim 1 wherein said hydraulic motor is a linear hydraulic motor with said displaceable element being coupled to a slidable element capable of effecting a linear displacement.

3. The system of claim 1 wherein said hydraulic valve means includes a diaphragm communicating on one side with the open atmosphere and on the other side with the pump pressure, said diaphragm being provided with means for opening a valve body in the valve against the pressure prevailing in the hydraulic motor as soon as the pump pressure falls below the atmospheric pressure.

4. The system of claim 3 wherein said means for opening a valve body includes a plunger coupled to said diaphragm capable of forcing the valve body from a valve seat.

5. The system of claim 1 wherein said displaceable element comprises a piston movable by the hydraulic pressure in a linear direction against the action of an associated spring in said cylinder, said piston being provided with means for the direct actuation of other elements.

6. The system of claim 1 wherein the inlet of the pump is connected to a storage vessel for hydraulic liquid.

7. The system of claim 1 wherein the pump is a positive displacement pump having an artificial leak passage arranged between the inlet and the outlet of the pump.